April 6, 1926. 1,579,592
C. R. BOWEN
CRANK CASE BRACE AND HANGER
Filed August 27, 1924  2 Sheets-Sheet 1

Inventor
Charles R. Bowen.
By Dowell and Dowell
his Attorneys

April 6, 1926. 1,579,592
C. R. BOWEN
CRANK CASE BRACE AND HANGER
Filed August 27, 1924   2 Sheets-Sheet 2
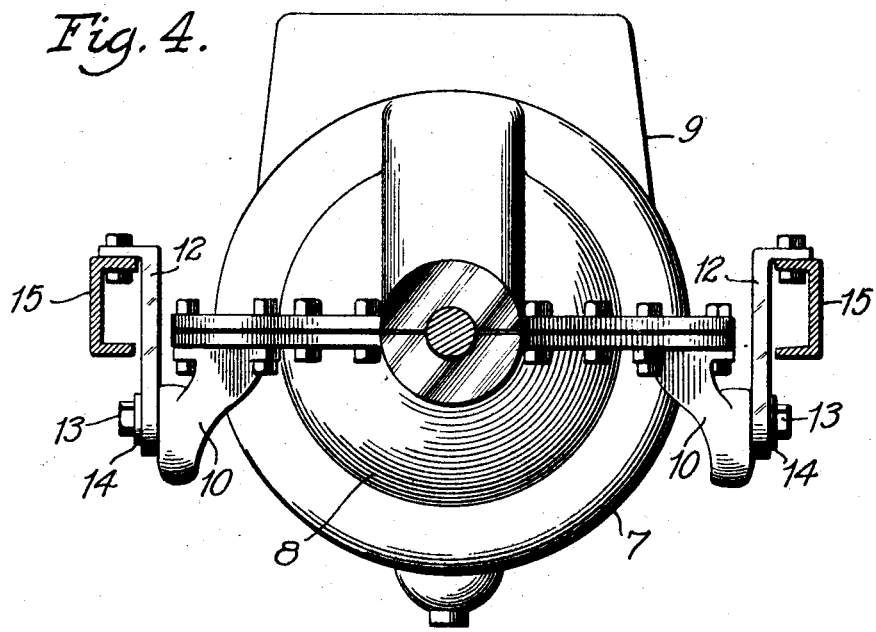
Fig. 4.
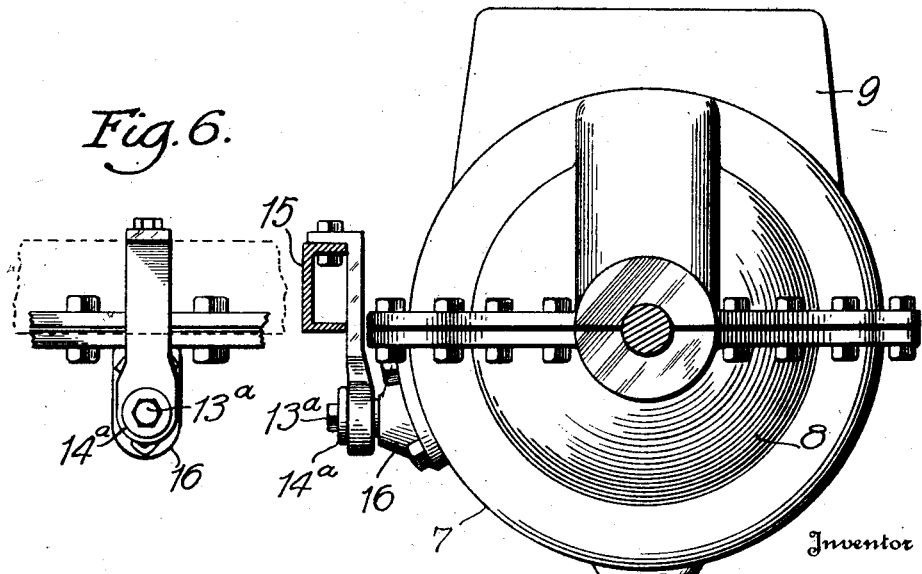
Fig. 5.
Fig. 6.
Inventor
Charles R. Bowen.
By Dowell and Dowell
his Attorneys Patented Apr. 6, 1926.

1,579,592

UNITED STATES PATENT OFFICE.

CHARLES R. BOWEN, OF GRAY, GEORGIA.

CRANK-CASE BRACE AND HANGER.

Application filed August 27, 1924. Serial No. 734,546.

*To all whom it may concern:*

Be it known that I, CHARLES R. BOWEN, a citizen of the United States, residing at Gray, in the county of Jones and State of Georgia, have invented certain new and useful Improvements in Crank-Case Braces and Hangers; and I do hereby declare the following to be a full, clear, and exact description of the invention, such as will enable others skilled in the art to which it appertains to make and use the same.

This invention relates to automobile crank-case hangers, and more particularly to a combined crank-case brace and hanger for the motors of Ford automobiles.

The principal object of the invention is to provide a self-adjusting or pivotal hanger for supporting a motor unit between the chassis or frame portions of a vehicle, so as to eliminate the strain and wrenching torque upon the crank-case, which are incident to the rigid suspensions heretofore employed. It is a well known fact that rigid motor suspensions, especially in Ford automobiles, permit severe strains upon the crank-case particularly when the vehicle is driven over rough or uneven roadways so that these hangers frequently break or else cause the crank-case under tension and strain, to crack or break at its corners, thus allowing the lubricating oil to splash or drain out with consequent over-heating and damage to the motor, making it necessary to effect repairs or replacement at considerable expense.

Another object is to provide a device of the character referred to, which, although particularly designed for a Ford automobile, may be quickly and easily applied to any motor unit, in place of the old rigid type of hanger, and may be substituted for the old hanger without necessity for jacking or removing the motor from place, thus materially reducing the expense heretofore incident to replacing a broken motor suspension.

The invention will first be hereinafter more particularly described with reference to the accompanying drawings, which are to be taken as a part of this specification, and then pointed out in the claims at the end of the description.

In said drawings, Fig. 1 is a fragmentary perspective view of the crank and transmission casings with secured cylinder-block of a Ford motor unit, illustrating the application of my improved crank-case brace and hanger thereto;

Fig. 4 is an end elevation of a motor unit supported in place by means of my improved crank-case brace and hanger;

Fig. 5 is a view similar to Fig. 4 showing the motor unit supported in place by a modified form of crank-case hanger; and Fig. 6 is a front elevation of said modification, the crank-case and united cylinder-block being fragmentarily shown.

Figure 1:
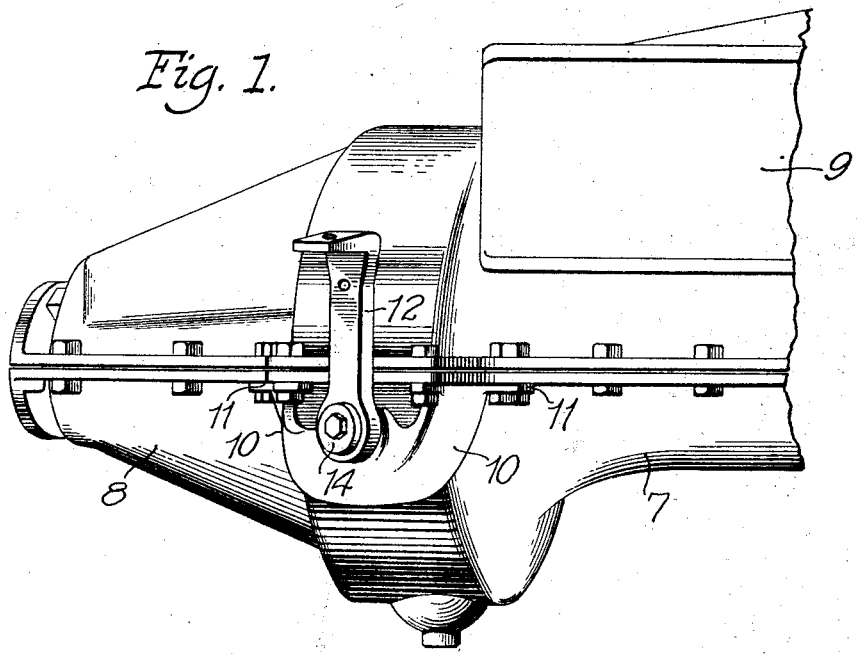
Figure 3:
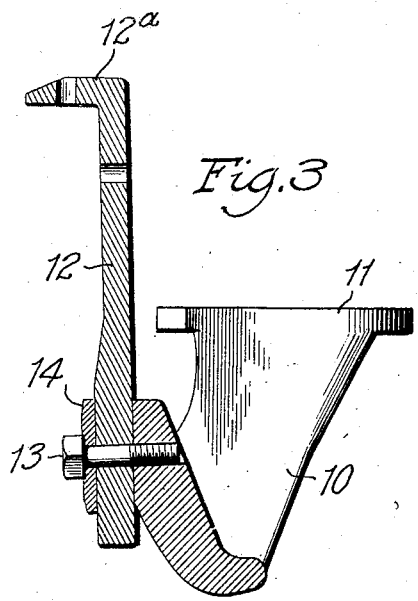
Fig. 3 is a section taken on the line 3—3 of Fig. 2.
Figure 2:
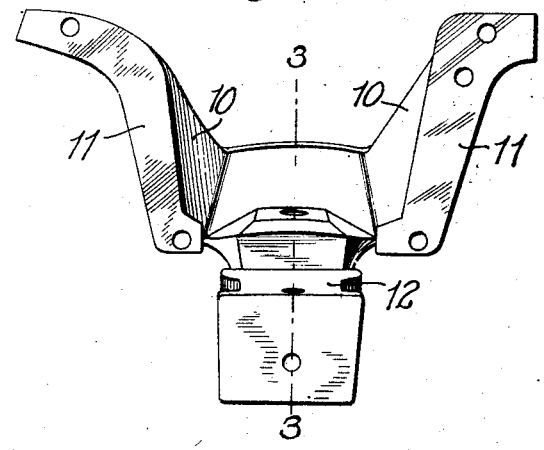
Fig. 2 is a plan view of the device showing its construction and peculiar form.

Referring to the drawings in which like reference numerals are used to designate corresponding parts throughout the several views, 7 and 8 respectively, denote the crank and transmission casings of an automobile motor, (a Ford motor in the present illustration), and 9 denotes the cylinder-block bolted in place thereon in the usual manner.

My improved crank-case brace and hanger element, is designed and adapted to be secured in place over the old or broken hanger with the latter resting upon a lip formed in the base of the former, said element comprising a rigid metallic casting of substantially cup-form, having a yoke or spaced side portions 10 terminating in flattened S-shaped extremities 11 conforming to and providing brace portions adapted to underlie the flange portions of the united casing members at either side of the fly wheel housing, said element being interchangeable on both sides of the motor. The S-shaped brace portions 11 being thus arranged to underlie the flange portions of the united casing members at their corners are formed with bolt holes corresponding with the holes in said flanges through which the ordinary holding bolts are extended to secure the element rigidly in place. Effective braces at the corners of the crank-case on either side of the motor are thus provided to prevent the casing members from cracking or breaking under torque or strain.

The intermediate or center wall of said cup-like casting is outwardly inclined and enlarged to form a stout bearing through which a substantially horizontal threaded orifice is provided, and an apertured suspending hanger-arm 12 is pivotally secured thereto by means of a partially threaded bearing bolt 13, a retaining or lock-washer 14 being preferably interposed between said arm and the head of the bolt. The free end of said hanger-arm is crooked or bent outwardly to form a head 12ª adapted to overlie and rest upon the angled-iron frame 15 of the vehicle chassis, and a bolt hole is provided in said head through which a bolt is passed to secure the hanger to the vehicle frame in a well known manner.

Thus it will be seen that I have provided a new, useful and convenient crank case brace with associated adjustable or resilient hanger element which will release or eliminate torque and strain upon the crank case or motor unit when the vehicle is driven over uneven ground and prevent the hanger-arm or crank and transmission casings from breaking or cracking under severe strains due to the wrenching or twisting of the vehicle chassis. Such wrenching or twisting of a vehicle on rough roads, particularly in the case of a Ford automobile, not only tends to crack the corners of the crank case and allow waste of oil, but the hanger-arm itself very frequently breaks with the rigid supports heretofore employed in Ford automobile construction.

When the old hanger-arm breaks on a Ford automobile, my improved crank case brace and hanger element may be readily and quickly substituted therefor over the broken part as above described without necessity for removing the motor, the two S-shaped brace portions at either side of the fly-wheel housing serving to reinforce and brace the united casings so as to eliminate all possibility of breaking or cracking at these points, thus providing a new and superior supporting element for the motor unit.

Referring now to Figs. 5 and 6 in which a modification of the hanger element is shown, 16 denotes a stout bearing block or plate which is riveted and welded to the crank case in place of the old supporting bracket or hanger plate with which Ford motor units are commonly provided at the factory, three rivet or bolts holes being formed in a peripheral flange portion of said block, corresponding with the holes in the crank case through which rivets or bolts are extended to secure the same rigidly in place, after which it is reinforcingly welded. An angled apertured hanger-arm substantially identical with the hanger 12, above described, is pivotally secured to or upon an extended bearing on said block in a manner similar to that described above, by means of a bearing bolt 13ª and an interposed holding or lock-washer 14ª, the difference between said modified form of hanger and the preferred embodiment of my invention being the elimination of the S-shaped brace portions adapted to underlie the bolted flanges of the united casing members, said modified form of supporting element thus providing a pivotal or resilient suspension for the motor unit without at the same time bracing the united casing members, but effectually relieving the torque and strain upon the motor unit when the vehicle is driven over rough roadways.

Having thus described my invention, what I claim as new and desire to secure by Letters Patent of the United States is:—

1. A crank-case brace and hanger element for the motor of a vehicle comprising a metallic casting of substantially cup-form having an enlarged central body portion with inner inclined and outer vertical faces and upwardly extended side portions terminating in flattened substantially horizontal extremities conforming in shape to and underlying the marginal flanges of the united casing members of the motor unit, to which said extremities are bolted at the corners thereof, and a hanger-arm having one end pivoted to said casting against its outer face and its other end extended over and bolted to the vehicle frame providing a pivotal support for the motor-unit.

2. In combination with a motor vehicle, a crank-case brace and hanger element comprising a metallic casting formed with an enlarged central body portion having an inwardly inclined inner face and a substantially vertical outer face and with upwardly extended side portions terminating in flattened substantially horizontal extremities conforming in shape to and underlying the flanges of the united motor casing members at their corners, and an angularly formed hanger-arm having its longer arm-portion pivoted to said casting against the outer face thereof and its shorter arm-portion extended over and bolted to the frame of the vehicle to provide a pivofal support for the motor-unit.

In testimony whereof I affix my signature.

CHARLES R. BOWEN.